United States Patent [19]
Peterson et al.

[11] Patent Number: 6,099,975
[45] Date of Patent: Aug. 8, 2000

[54] MOLDED NIPPLE CONNECTION SYSTEM

[76] Inventors: Willis H. Peterson, 6807 Hwy. 32 South, Lisbon, N. Dak. 58054-9301; James Zespy, 1112 22nd St. South #303, Fargo, N. Dak. 58103

[21] Appl. No.: 09/172,964

[22] Filed: Oct. 14, 1998

Related U.S. Application Data

[60] Provisional application No. 60/084,613, May 7, 1998.

[51] Int. Cl.[7] .................................................. B21D 28/32
[52] U.S. Cl. ........................... 428/596; 220/694; 249/83; 264/241; 264/259; 264/273; 285/239; 285/422; 285/423; 285/923; 403/24; 403/269
[58] Field of Search ............................ 428/596; 285/239, 285/422, 423, 923; 220/694; 249/83; 264/241, 259, 273; 403/24, 269

[56] References Cited

U.S. PATENT DOCUMENTS

| | | | |
|---|---|---|---|
| 3,614,137 | 10/1971 | Jacobson | 285/423 |
| 4,292,846 | 10/1981 | Barnett | 220/694 |
| 4,572,386 | 2/1986 | Marcus | 220/694 |
| 4,679,405 | 7/1987 | Mitchell et al. | 285/239 |
| 4,960,342 | 10/1990 | Chi | 403/24 |
| 5,366,257 | 11/1994 | McPherson et al. | 285/423 |

*Primary Examiner*—Deborah Jones
*Assistant Examiner*—Robert R. Koehler
*Attorney, Agent, or Firm*—Michael S. Neustel

[57] ABSTRACT

A molded nipple connection system for permanently molding a metal nipple within a plastic container that is not susceptible to expansion/contraction forces incurred by the plastic container. The inventive device includes a metal nipple having a threaded end or a cincture surrounded end, a lumen, an immersion end positioned within the plastic during molding, and a plurality of openings adjacent the immersion end. The plurality of openings allow the liquefied plastic during molding to project through the exterior surface of the metal nipple into the lumen of the metal nipple where it is joined with liquefied plastic within the lumen of the metal nipple. After hardening of the plastic, the mold is removed and the metal nipple is captured within the plastic container because of the plastic-securing loop created through the plurality of openings. The plurality of openings are preferably slots, however they may comprise various other well-known shapes.

12 Claims, 3 Drawing Sheets

MOLDED NIPPLE CONNECTION SYSTEM

CROSS-REFERENCE TO RELATED U.S. PATENT APPLICATION

I hereby claim benefit under Title 35, United States Code, Section 119(e) of U.S. provisional patent application Ser. No. 60/084,613 filed May 7, 1998 expired.

BACKGROUND OF THE INVENTION

1. Field of the Invention

The present invention relates generally to nipple attachments and more specifically it relates to a molded nipple connection system for permanently molding a metal nipple within a plastic container that is not susceptible to expansion/contraction forces incurred by the plastic container.

2. Description of the Prior Art

Nipple attachments have been in use for years. Typically, the nipple is molded from plastic directly within the container. Since a sealing cincture or threads are usually required within the nipple for attaching to a hose or coupler, the mold's halves meet at the plastic nipple portion to allow the molds to be removed from the nipple portion. This causes an undesirable longitudinal plastic "ridge" to be formed into the nipple because of leakage of plastic between the mold's halves. This ridge prevents a proper seal or threading onto the nipple. Therefore, conventionally the ridge must be removed by grinding or other process. During the removal process, it is almost impossible to perfectly remove the ridge, either removing to much plastic or not enough. Hence, a perfect seal is never achieved using conventional molding methods.

Molding a metal nipple within a mold has also been attempted with limited success. A metal nipple is more desirable than a plastic nipple of its ability to resist wearing over time. The most common problem is that the metal nipple will become dislodged overtime allowing the nipple to rotate and/or become removed. Additionally, extreme temperatures cause the plastic to contract and expand thereby loosening the plastic from the nipple. Also, forces applied to the plastic container can cause the container to expand around the nipple allowing the nipple to be removed from the container.

Examples of nipple attachments include U.S. Pat. No. 4,679,405 to Mitchell et al; U.S. Pat. No. 3,614,137 to Jacobson; U.S. Pat. No. 5,366,257 to McPherson et al; U.S. Pat. No. 4,292,846 to Barnett; U.S. Pat. No. 4,572,386 to Marcus; U.S. Pat. No. 4,960,342 to Chi which are all illustrative of such prior art.

Mitchell et al (U.S. Pat. No. 4,679,405) discloses a molded drain connection with insert. Mitchell teaches an integrally threaded brass insert molded into a discharge conduit of a condensate pan such that a steel drainage pipe can be threadably engaged to the insert without causing damage to the plastic discharge conduit. Mitchell further teaches the use of a "knurled" surface on the outer periphery of the insert to prevent removal. This structure is still susceptible to the expansion of the plastic due to forces and temperature thereby allowing the insert to be dislodged.

While these devices may be suitable for the particular purpose to which they address, they are not as suitable for permanently molding a metal nipple within a plastic container that is not susceptible to expansion/contraction forces incurred by the plastic container. The prior art inventions are easily removed from the plastic container they are molded within. Additionally, the molded plastic nipples are not desirable because of inherent sealing problems.

In these respects, the molded nipple connection system according to the present invention substantially departs from the conventional concepts and designs of the prior art, and in so doing provides an apparatus primarily developed for the purpose of permanently molding a metal nipple within a plastic container that is not susceptible to expansion/contraction forces incurred by the plastic container.

SUMMARY OF THE INVENTION

In view of the foregoing disadvantages inherent in the known types of nipple attachments now present in the prior art, the present invention provides a new molded nipple connection system construction wherein the same can be utilized for permanently molding a metal nipple within a plastic container that is not susceptible to expansion/contraction forces incurred by the plastic container.

The general purpose of the present invention, which will be described subsequently in greater detail, is to provide a new molded nipple connection system that has many of the advantages of the nipple attachments mentioned heretofore and many novel features that result in a new molded nipple connection system which is not anticipated, rendered obvious, suggested, or even implied by any of the prior art nipple attachments, either alone or in any combination thereof.

To attain this, the present invention generally comprises a metal nipple having a threaded end or a cincture surrounded end, a lumen, an immersion end positioned within the plastic during molding, and a plurality of openings adjacent the immersion end. The plurality of openings allow the liquefied plastic during molding to project through the exterior surface of the metal nipple into the lumen of the metal nipple where it is joined with liquefied plastic within the lumen of the metal nipple. After hardening of the plastic, the mold is removed and the metal nipple is captured within the plastic container because of the plastic-securing loop created through the plurality of openings. The plurality of openings are preferably slots, however they may comprise various other well-known shapes.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be understood that the phraseology and terminology employed herein are for the purpose of the description and should not be regarded as limiting.

A primary object of the present invention is to provide a molded nipple connection system that will overcome the shortcomings of the prior art devices.

Another object is to provide a molded nipple connection system that permanently attaches a metal nipple within a container.

An additional object is to provide a molded nipple connection system that is not susceptible to expansion/contraction forces of the plastic container.

A further object is to provide a molded nipple connection system that allows a metal nipple to be permanently secured within a plastic container.

Another object is to provide a molded nipple connection system that reduces the amount of time and labor required to produce a finished product with a nipple positioned within a plastic container.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 2:
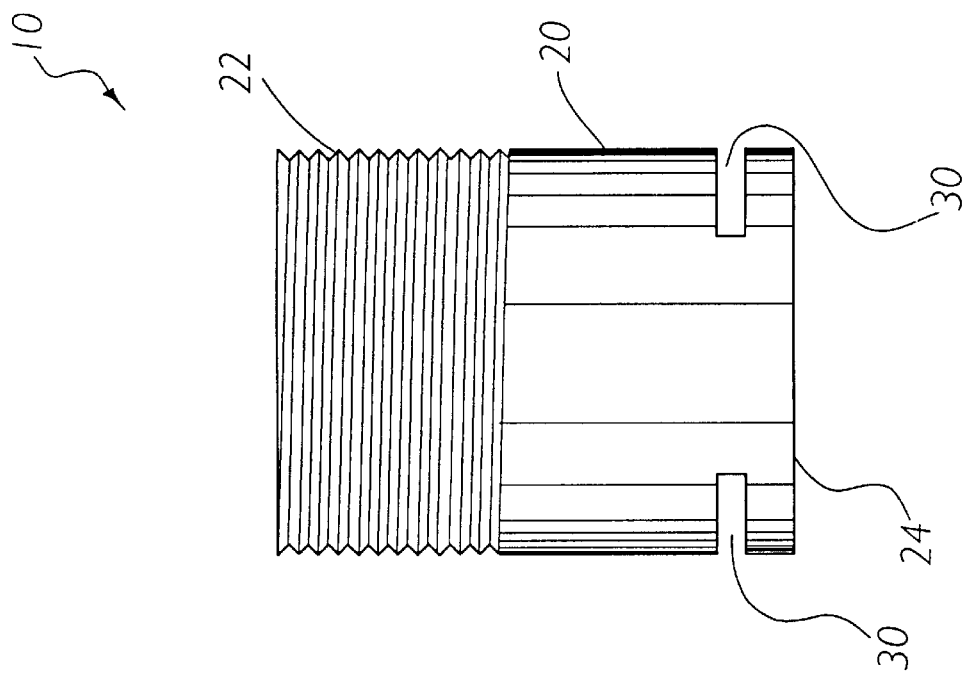
FIG. 2 is a side view of the present invention showing a pair of slots extending into the nipple at least 10% of the diameter of the nipple.
Figure 1:
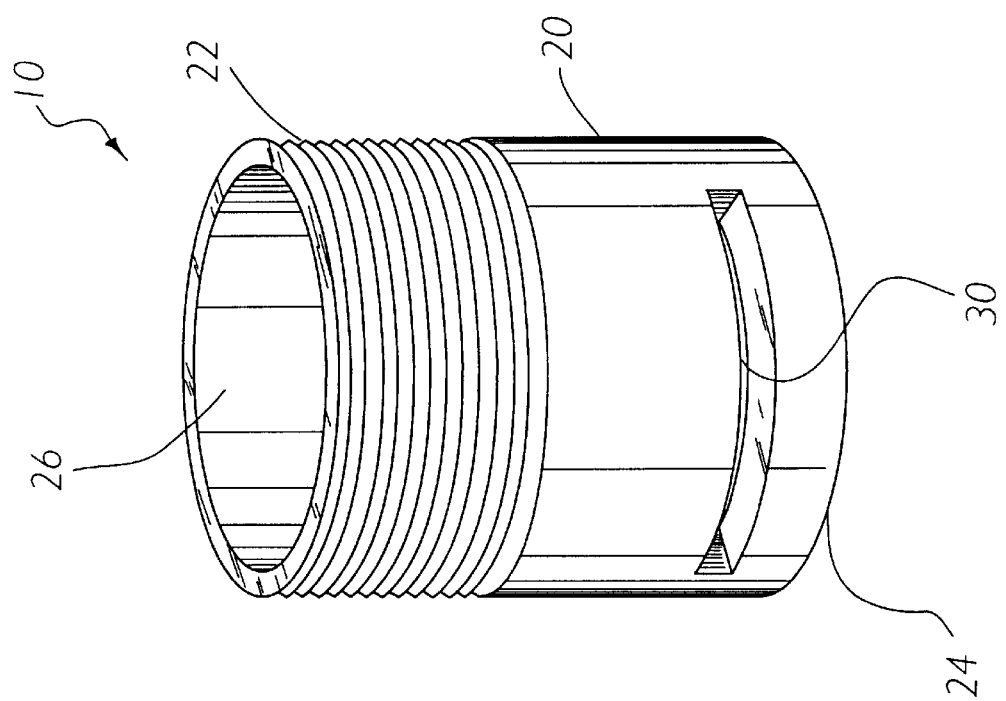
FIG. 1 is an upper perspective view of the present invention with a pair of slots within.
Figure 3:
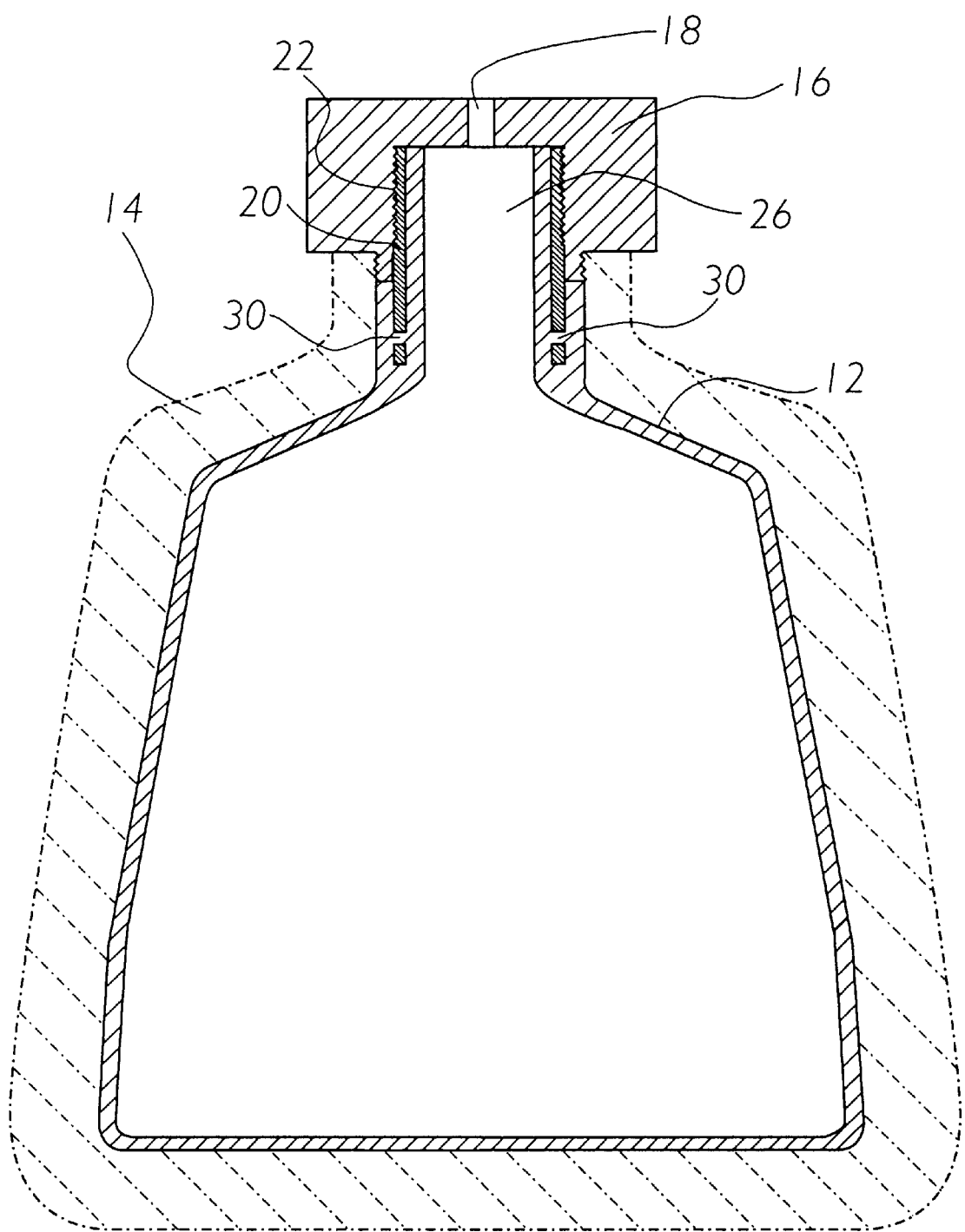
FIG. 3 is a cut-away view of the metal nipple being molded within the plastic container and surrounded by the mold.
Figure 5:
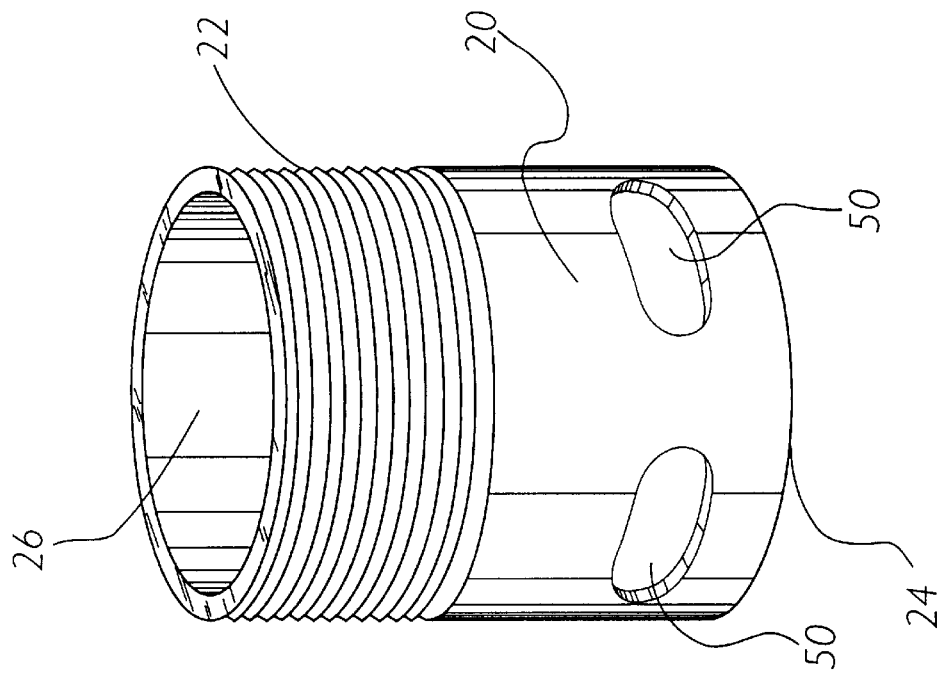
FIG. 5 is an upper perspective view of a third embodiment of the present invention with oblong openings.
Figure 4:
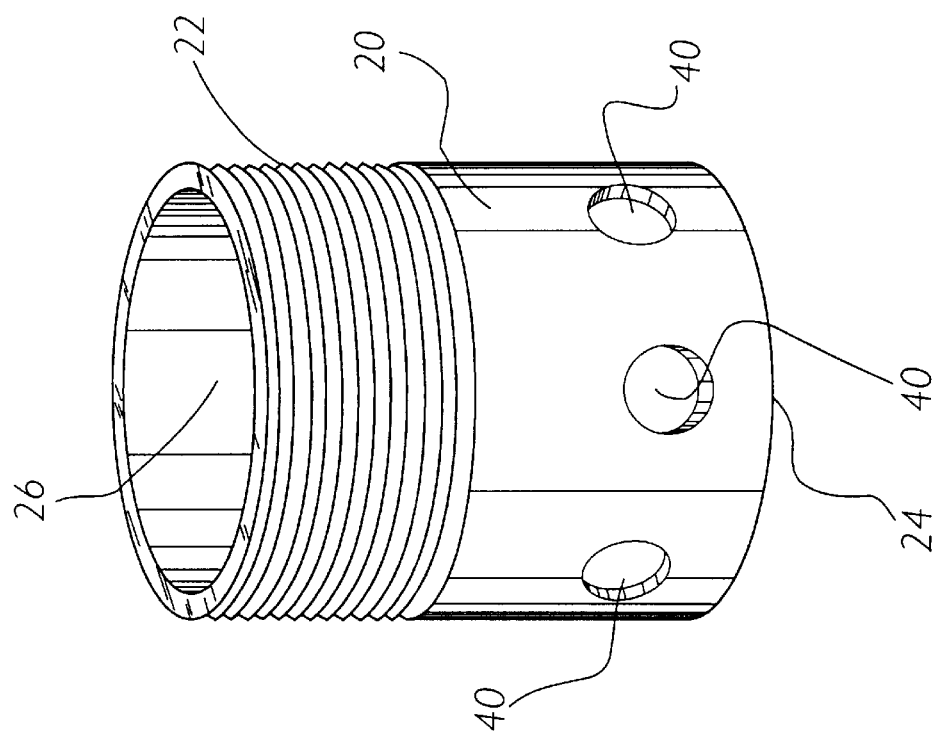
FIG. 4 is an upper perspective view of a second embodiment of the present invention with holes.

Turning now descriptively to the drawings, in which similar reference characters denote similar elements throughout the several view, FIGS. 1 through 5 illustrate a molded nipple connection system 10, which comprises a metal nipple 20 having a threaded end 22 or a cincture surrounded end, a lumen 26, an immersion end 24 positioned within the plastic during molding, and a plurality of openings 30, 40 or 50 adjacent the immersion end 24. The plurality of openings 30, 40 or 50 allow the liquefied plastic during molding to project through the exterior surface of the metal nipple 20 into the lumen 26 of the metal nipple 20 where it is joined with liquefied plastic within the lumen 26 of the metal nipple 20. After hardening of the plastic, the mold 14 is removed and the metal nipple 20 is captured within the plastic container 12 because of the plastic-securing loop created through the plurality of openings 30, 40 or 50. The plurality of openings 30, 40 or 50 are preferably slots 30, however they may comprise various other well-known shapes as shown in FIGS. 1, 4 and 5 of the drawings. The inventive process may be utilized in various types of molding, including injection molding and rotational molding.

As best shown in FIGS. 1, 4 and 5 of the drawings, the nipple 20 is preferably tubular in shape, however it can be appreciated by one skilled in the art that various other shapes may be utilized. The nipple 20 is preferably constructed of metal such as brass, however other suitable materials may also be utilized to construct the nipple 20 as is known in the art. The nipple 20 has a lumen 26 as shown in FIGS. 1, 4 and 5.

The nipple 20 preferably includes a threaded end 22 for threadably attaching to a coupler or another structure, however other attaching means known in the art may be utilized such as a cincture for retaining rubber hoses. Opposite of the threaded end 22 is the immersion end 24. The immersion end 24 is completely retained within the plastic container 12 during and after the molding process.

As shown in FIG. 1 of the drawings, the nipple 20 preferably includes at least one opening 30, 40 or 50 such as a plurality of slots 30 projecting completely through the nipple 20. The openings 30, 40 or 50 may also be comprised of a circular aperture 40 as shown in FIG. 4 of the drawings. The openings 30, 40 or 50 within the nipple 20 may also be comprised of oblong openings 50 as shown in FIG. 5 of the drawings. As can be appreciated by one skilled in the art, various other shapes and designs may be utilized as openings within the nipple 20.

In use, the metal nipple 20 is prepared by cutting the desired shape of opening 30, 40 or 50 into the nipple 20 adjacent the immersion end 24. After the opening 30, 40 or 50 is cut into the metal nipple 20, the nipple 20 is positioned into the mold 14 as shown in FIG. 3 of the drawings. FIG. 3 shows the use of a rotational mold 14 utilized in rotational molding, however it can be appreciated that other types of molding may be utilized. A cap 16 catchably retains the nipple 20 in the proper position within the mold 14 during molding. A vent opening 18 within the cap 16 allows a vent tube to be extended into the center of the mold during molding. During the rotational molding process, the mold is heated which liquefies the granular plastic within the mold 14. The liquefied plastic is layered within the interior walls of the mold 14 because of the rotational action thereby forming the container 12. During the rotation, the liquefied plastic also extends along the exterior surface of the nipple 20 to the cap 16 forming an outer layer as shown in FIG. 3. Also, the liquefied plastic extends along the lumen 26 of the nipple 20 to the cap 16 forming an inner layer as further shown in FIG. 3 of the drawings. Finally, during the rotation of the mold 14, the liquefied plastic extends through the slot 30 or other opening 40 or 50 within the nipple 20 forming a joining layer that connects the outer layer to the inner layer. The mold 14 is removed from the heat source where it is cooled to harden the liquefied plastic. The mold 14 is removed from about the hardened container 12 and the cap 16 is removed from the nipple 20. The joining layer prevents vertical movement of the nipple 20 or rotational movement of the nipple 20 with respect to the container 12. The joining layer also prevents the outer layer from being removed from the nipple 20 during expansion and contraction of the container 12 due to temperature or other forces. The slots 30 are preferably used within the nipple 20 to provide the maximum strengthening of the nipple 20 and the container 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A molded nipple connection system, comprising:

a tubular nipple having a connecting end, an immersion end, an exterior surface and a lumen; and at least one opening projecting through said tubular nipple near said immersion end, wherein said immersion end is positionable within a mold during molding of a plastic structure thereby allowing liquefied plastic to extend between said at least one opening to connect an exterior layer and an interior layer surrounding a portion of said tubular nipple.

2. The molded nipple connection system of claim 1, wherein said at least one opening comprises a plurality of slots projecting orthogonally into said tubular nipple.

3. The molded nipple connection system of claim 1, wherein said at least one opening comprises a plurality of circular apertures projecting orthogonally into said tubular nipple.

4. The molded nipple connection system of claim 1, wherein said at least one opening comprises a plurality of oblong openings projecting orthogonally into said tubular nipple.

5. The molded nipple connection system of claim 2, wherein said plurality of slots comprises a pair of slots in opposition to one another.

6. The molded nipple connection system of claim 5, wherein each of said pair of slots extend into said nipple at least 10% of the diameter of said nipple.

7. The molded nipple connection system of claim 6, wherein said connecting end is comprised of a threaded end.

8. The molded nipple connection system of claim 7, wherein said tubular nipple is comprised of brass.

9. The molded nipple connection system of claim 8, wherein said tubular nipple has a circular cross-section.

10. A method of molding a tubular nipple into a plastic structure using rotational molding, said method comprising the steps of:

(a) providing a tubular nipple having a connecting end, an immersion end, an exterior surface and a lumen;

(b) cutting at least one opening into said tubular nipple near said immersion end;

(c) providing a mold and a nipple retaining means;

(d) connecting said tubular nipple to said connecting end of said nipple retaining means;

(e) inserting granular plastic into said mold;

(f) inserting said immersion end of said tubular nipple into said mold wherein said exterior surface of said tubular nipple is distally spaced from said mold;

(g) heating said mold to liquefy said granular plastic; and (h) rotating said mold so liquefied plastic flows adjacent said exterior surface and said lumen of said tubular nipple, and wherein said liquefied plastic flows through said at least one opening.

11. The method of molding a tubular nipple into a plastic structure of claim 10, wherein said method further comprises the step of:

(i) cooling said mold to harden said liquefied plastic with said tubular nipple within.

12. A method of molding a tubular nipple into a plastic structure using injection molding, said method comprising the steps of:

(a) providing a tubular nipple having a connecting end, an immersion end, an exterior surface and a lumen;

(b) cutting at least one opening into said tubular nipple near said immersion end;

(c) providing a mold and a nipple retaining means;

(d) connecting said tubular nipple to said connecting end of said nipple retaining means;

(e) inserting said immersion end of said tubular nipple into said mold wherein said exterior surface of said tubular nipple is distally spaced from said mold; and (f) inserting liquefied plastic into said mold, wherein said liquefied plastic flows adjacent said exterior surface and said lumen of said tubular nipple, and wherein said liquefied plastic flows through said at least one opening.

* * * * *